(12) United States Patent
Hsi

(10) Patent No.: US 9,740,256 B2
(45) Date of Patent: Aug. 22, 2017

(54) ELECTRICAL DEVICE WITH DETACHABLE STORAGE MODULE

(71) Applicant: Primax Electronics Ltd., Neihu, Taipei (TW)

(72) Inventor: Chen-Ning Hsi, Taipei (TW)

(73) Assignee: PRIMAX ELECTRONICS LTD., Neihu, Taipei (TW)

( * ) Notice: Subject to any disclaimer, the term of this patent is extended or adjusted under 35 U.S.C. 154(b) by 190 days.

(21) Appl. No.: 14/693,422

(22) Filed: Apr. 22, 2015

(65) Prior Publication Data

US 2016/0195912 A1     Jul. 7, 2016

(30) Foreign Application Priority Data

Jan. 5, 2015   (TW) .............................. 104100057 A

(51) Int. Cl.
   *G06F 12/00*   (2006.01)
   *G06F 1/26*   (2006.01)
   *G06F 13/42*   (2006.01)

(52) U.S. Cl.
   CPC .......... *G06F 1/266* (2013.01); *G06F 13/4282* (2013.01)

(58) Field of Classification Search
   CPC .............................. G06F 1/266; G06F 13/4282
   USPC .................................................. 711/103, 114
   See application file for complete search history.

(56) References Cited

U.S. PATENT DOCUMENTS

| | | | | |
|---|---|---|---|---|
| 5,835,780 A | * | 11/1998 | Osaki ........................ | G06F 1/30 713/300 |
| 9,009,417 B2 | * | 4/2015 | Okawa .................. | G06F 1/3212 711/113 |
| 9,030,166 B2 | * | 5/2015 | Kano ...................... | G06F 1/266 320/107 |
| 2010/0008175 A1 | * | 1/2010 | Sweere ............... | G06F 12/0866 365/229 |

* cited by examiner

*Primary Examiner* — Matthew Bradley
(74) *Attorney, Agent, or Firm* — Kirton McConkie; Evan R. Witt

(57) ABSTRACT

An electrical device includes a main body and a detachable storage module. The main body includes a first data storage unit and is operable in plural storing modes. The detachable storage module includes a second data storage unit. When the detachable storage module is connected with the main body, the detachable storage module provides electric power to the main body and the user may select one of the plural storing modes. According to the selected storing mode, the controlling unit of the main body determines whether the data is stored in the first data storage unit or the second data storage unit. By the detachable storage module, the electrical device is more user-friendly.

10 Claims, 8 Drawing Sheets

ELECTRICAL DEVICE WITH DETACHABLE STORAGE MODULE

FIELD OF THE INVENTION

The present invention relates to an electrical device with a detachable storage module, and more particularly to an electrical device with a detachable storage module in order to provide an additional battery unit and an additional data storage unit.

BACKGROUND OF THE INVENTION

Nowadays, most electrical devices are portable electrical devices because the portable electrical devices can be easily carried and can be used everywhere. However, the power source of the electrical device is usually a battery unit of the electrical device. When the electric power of the battery unit is exhausted, the battery unit cannot provide the electric power continuously. That is, before the battery unit is replaced with a new one or the battery unit is charged, the electrical device cannot be continuously used.

With increasing development of science and technology, the quality of the data that is generated by or stored in the electrical device is gradually advanced and the byte number of the data is gradually increased. Take the image pickup devices as examples. For most image pickup devices, the demand on the generation of the high quality image data is increased, and the byte number of the high quality image data is higher than the ordinary quality image data. If the image pickup device is used to capture a video file, the byte number of the video file comprising plural high quality image data is much higher than the byte number of the ordinary quality video file. Generally, the data of the image pickup device is stored in a data storage unit (e.g. a SD card). Once the data storage unit is full of the data, the data storage unit cannot continuously provide the storage space. Consequently, before the data storage unit is replaced with a new one or the data in the data storage unit is deleted, the electrical device cannot be continuously used.

As mentioned above, it is an important issue to provide sufficient electric power and sufficient data storage space to the electrical device.

Therefore, there is a need of providing an electrical device with a detachable storage module in order to overcome the above drawbacks.

SUMMARY OF THE INVENTION

An object of the present invention provides an easy-to-use electrical device with a detachable storage module.

In accordance with an aspect of the present invention, there is provided an electrical device. The electrical device includes a main body and a detachable storage module. The main body generates a data. The main body includes a first data storage unit, a first battery unit and a controlling module. The first data storage unit stores the data. The first battery unit provides a first electric power. The controlling module is electrically connected with the first data storage unit, the first battery unit and the detachable storage module. The detachable storage module includes a second data storage unit and a second battery unit. The second data storage unit stores the data from the main body. The second battery unit provides a second electric power to the main body. The controlling unit is operable in plural storing modes. According to a selected storing mode of the plural storing modes, the controlling unit determines whether the data is stored in the first data storage unit or the second data storage unit.

In an embodiment, the plural storing modes include a first expansion storing mode, a second expansion storing mode and a backup storing mode. If the selected storing mode is the first expansion storing mode, the data is firstly stored in the first data storage unit until an available capacity of the first data storage unit is lower than a predetermined capacity and then the data is stored in the second data storage unit. If the selected storing mode is the second expansion storing mode, the data is firstly stored in the first data storage unit until the available capacity of the first data storage unit is lower than the predetermined capacity, and then the data in the first data storage unit is stored in the second data storage unit and the data in the first data storage unit is deleted. If the selected storing mode is the backup storing mode, the data is stored in both of the first data storage unit and the second data storage unit.

In an embodiment, the controlling unit is further operable in plural power supply modes, and the plural power supply modes include a charging mode and a battery mode. If the controlling unit is in the charging mode, the second battery unit provides the second electric power to the first battery unit so as to charge the first battery unit. If the controlling unit is in the battery mode, the second battery unit provides the second electric power to the controlling unit.

In an embodiment, the main body is an image pickup device, and the data generated by the main body is an image data or a video data.

In an embodiment, the main body further includes a first transmission interface, and the detachable storage module further includes a second transmission interface. The first transmission interface is electrically connected with the controlling unit. The second transmission interface is connectable with the first transmission interface.

In an embodiment, the first transmission interface and the second transmission interface are universal serial bus (USB) interfaces.

In an embodiment, each of the first data storage unit and the second data storage unit is a hard disk, a memory card or an external memory card.

In an embodiment, the detachable storage module further includes a card slot, and the second data storage unit is an external memory card. The second data storage unit is accommodated within the card slot.

In an embodiment, the detachable storage module further includes a connecting unit, and the connecting unit is in wired or wireless communication with a charging dock. The second battery unit of the detachable storage module is charged by the charging dock.

In an embodiment, when the detachable storage module is in communication with a charging dock, a third electric power is transmitted from the charging dock to the detachable storage module so as to charge the second battery unit. The data in the second data storage unit is further transmitted from the detachable storage module to the charging dock.

In an embodiment, the second data storage unit is electrically connected with the second battery unit, and the second battery unit provides the second electric power to the second data storage unit.

The above objects and advantages of the present invention will become more readily apparent to those ordinarily skilled in the art after reviewing the following detailed description and accompanying drawings, in which:

DETAILED DESCRIPTION OF THE PREFERRED EMBODIMENT

Figure 1:
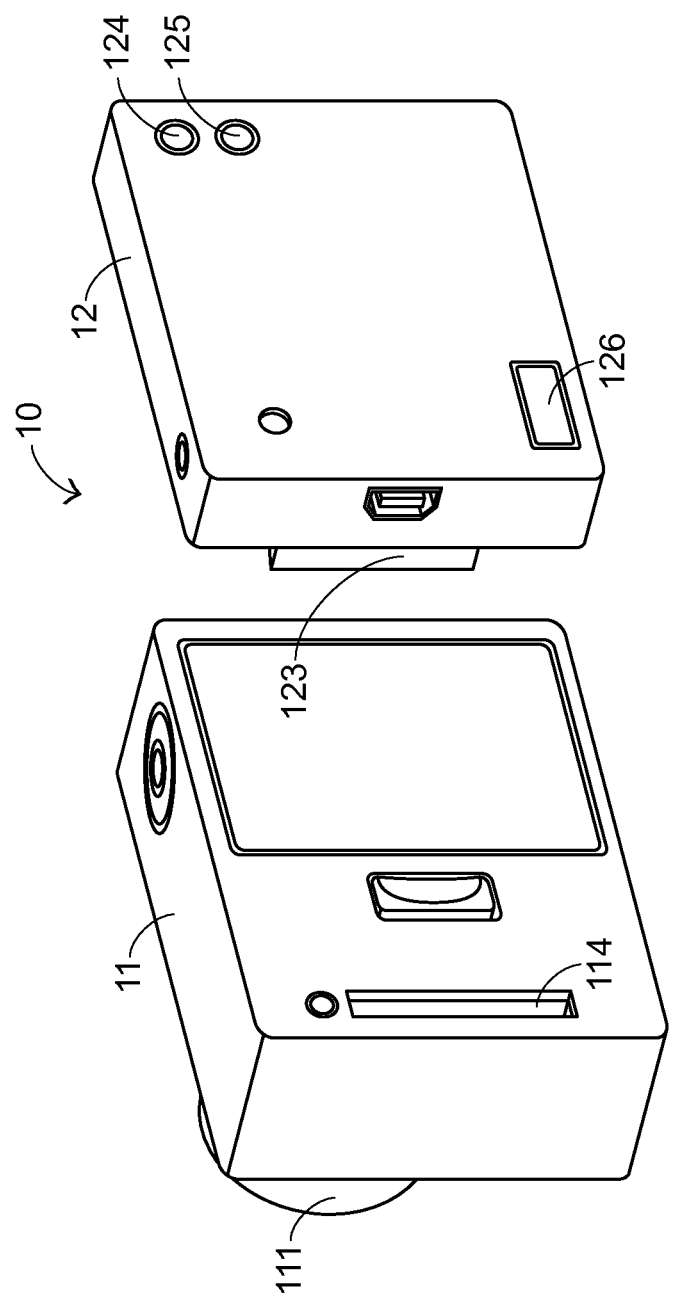
FIG. 1 schematically illustrates an electrical device with a detachable storage module according to a first embodiment of the present invention.

FIG. 1 schematically illustrates an electrical device with a detachable storage module according to a first embodiment of the present invention. As shown in FIG. 1, the electrical device 10 comprises a main body 11 and a detachable storage module 12. The main body 11 may generate a data. The detachable storage module 12 is used for providing electric power and a data storage space to the main body 11. According to the demands on the electric power and the data storage space, the detachable storage module 12 is selectively connected with the main body 11 or disconnected from the main body 11. When the detachable storage module 12 is electrically connected with the main body 11, the detachable storage module 12 provides the electric power and the data storage space to the main body 11. Consequently, the overall electric quantity and the overall data storage space of the electrical device 10 are increased. Under this circumstance, the run time of the main body 11 is prolonged.

An example of the main body 11 of the electrical device 10 includes but is not limited to a smart phone, a notebook computer, an image pickup device or any other appropriate electrical device. In this embodiment, the main body 11 is an image pickup device. Preferably but not exclusively, the main body 11 is an extreme sports image pickup device that requires a great deal of electric quantity and a great deal of data storage space. Since the main body 11 is the image pickup device, the data generated by the main body 11 is an image data or a video data.

Figure 2:
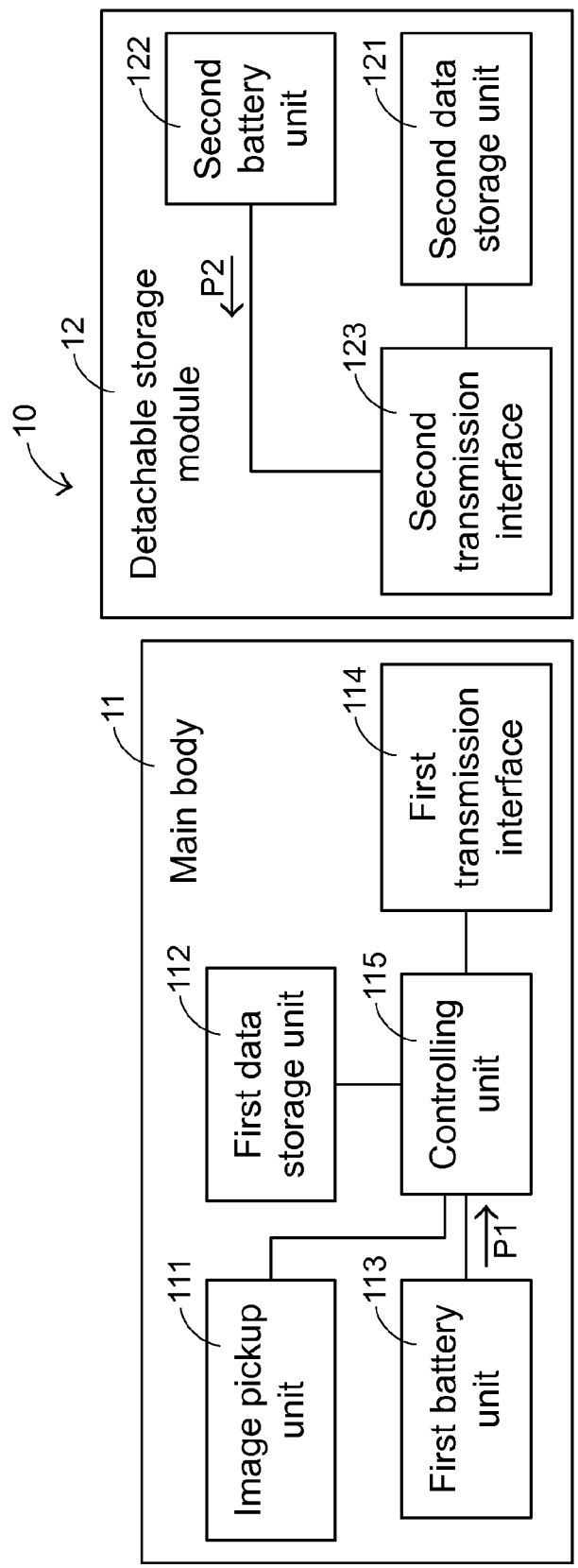
FIG. 2 is a schematic functional block diagram illustrating the electrical device with the detachable storage module according to the first embodiment of the present invention.

Hereinafter, the operations of the electrical device of the first embodiment will be illustrated with reference to FIG. 2. FIG. 2 is a schematic functional block diagram illustrating the electrical device with the detachable storage module according to the first embodiment of the present invention. As shown in FIG. 2, the electrical device 10 comprises the main body 11 and the detachable storage module 12. The main body 11 comprises an image pickup unit 111, a first data storage unit 112, a first battery unit 113, a first transmission interface 114 and a controlling unit 115. The detachable storage module 12 comprises a second data storage unit 121, a second battery unit 122 and a second transmission interface 123.

Please refer to FIGS. 1 and 2 again. The first data storage unit 112, the first battery unit 113 and the first transmission interface 114 are disposed within the main body 11. The image pickup unit 111 is protruded from an outer surface of the main body 11. It is noted that the positions of these components are not restricted. The image pickup unit 111, the first data storage unit 112, the first battery unit 113 and the first transmission interface 114 are electrically connected with the controlling unit 115. Moreover, the image pickup unit 111, the first data storage unit 112, the first battery unit 113 and the first transmission interface 114 are controlled by the controlling unit 115. The image pickup unit 111 is used for generating the data. The first data storage unit 112 is used for storing the data. The first battery unit 113 is used for storing a first electric power P1 and providing the first electric power P1 to other power consumption components of the main body 11. For example, the power consumption components comprise the image pickup unit 111, the first data storage unit 112 and the controlling unit 115. The first transmission interface 114 may be connected with the second transmission interface 123 of the detachable storage module 12.

After the image pickup unit 111 issues the data to the controlling unit 115, the data is transmitted from the controlling unit 115 to the first data storage unit 112. After the data is received by the first data storage unit 112, the data is stored in the first data storage unit 112. For example, the first battery unit 113 is a chargeable battery such as a lithium battery, a lithium ion battery or a lithium-ion polymer battery. The first battery unit 113 is used for storing the first electric power P1 and providing the first electric power P1. The image pickup unit 111 is a CCD module, a CMOS module or any other appropriate image pickup module. The first data storage unit 112 is a hard disk, a memory card or an external memory card. In this embodiment, the first data storage unit 112 is an external memory card such as a SD card.

The second transmission interface 123 is protruded from an outer surface of the detachable storage module 12. Moreover, the second transmission interface 123 is connectable with the first transmission interface 114 of the main body 11. Preferably but not exclusively, the second data storage unit 121 and the second battery unit 122 are disposed within the detachable storage module 12. The second data storage unit 121 and the second battery unit 122 are electrically connected with the second transmission interface 123. The second data storage unit 121 is used for storing the data from the main body 11. The second battery unit 122 is used for providing a second electric power P2 to the main body 11 so as to increase the run time of the main body 11. Examples of the first transmission interface 114 and the second transmission interface 123 include but are not limited to universal serial bus (USB) interfaces. The second data storage unit 121 is a hard disk, a memory card or an external memory card. The second battery unit 122 is a chargeable battery such as a lithium battery, a lithium ion battery or a lithium-ion polymer battery. In this embodiment, the second data storage unit 121 is a hard disk or a memory card that is built in the detachable storage module 12.

For allowing the electrical device 10 to comply with different requirements of the user, the controlling unit 115 of the main body 11 is selectively operated in one of plural storing modes. When the detachable storage module 12 is connected with the main body 11, the controlling unit 115 may judge which storing mode is selected from the plural storing modes by the user. According to the selected storing mode, the controlling unit 115 may determine whether the data is stored in either the first data storage unit 112 or the second battery unit 122 or the data is stored in both of the first data storage unit 112 and the second battery unit 122.

Generally, when the detachable storage module 12 is connected with the main body 11, a portion of an operation interface of the main body 11 is hidden by the detachable storage module 12. Under this circumstance, it is difficult to operate the operation interface of the main body 11. For solving this drawback, as shown in FIG. 1, the detachable storage module 12 further comprises a first operation interface 124 for allowing the user to operate. Moreover, via the first operation interface 124, the user may select a specified storing mode from the controlling unit 115. An example of the first operation interface 124 includes but is not limited to a button, a toggle switch or a touch panel. In this embodiment, the first operation interface 124 is a button. The operations of the plural storing modes of the controlling unit 115 will be illustrated as follows.

Figure 3A:
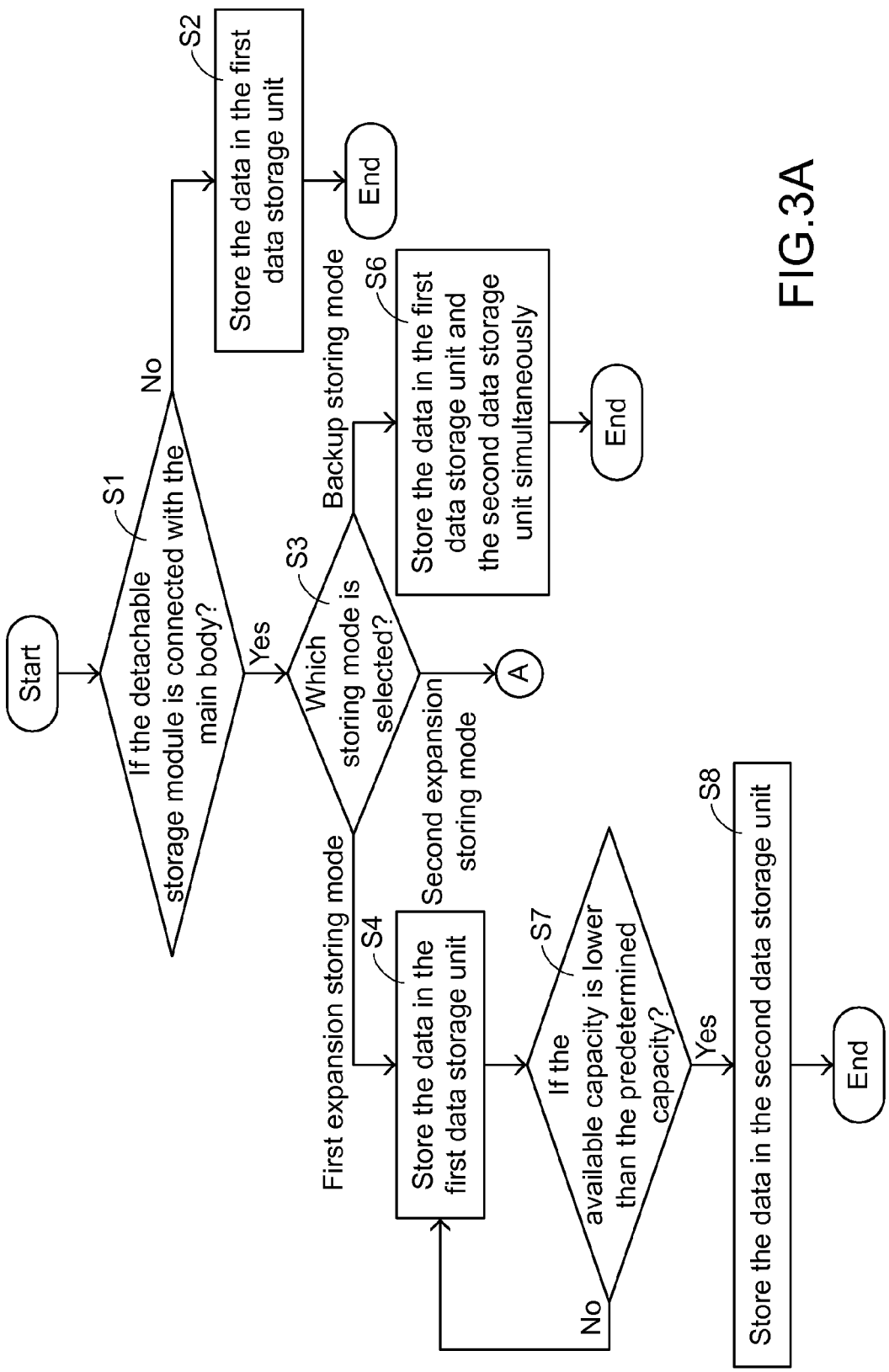
FIGS. 3A and 3B is a flowchart illustrating a method of storing data by the electrical device of the present invention.
Figure 3B:
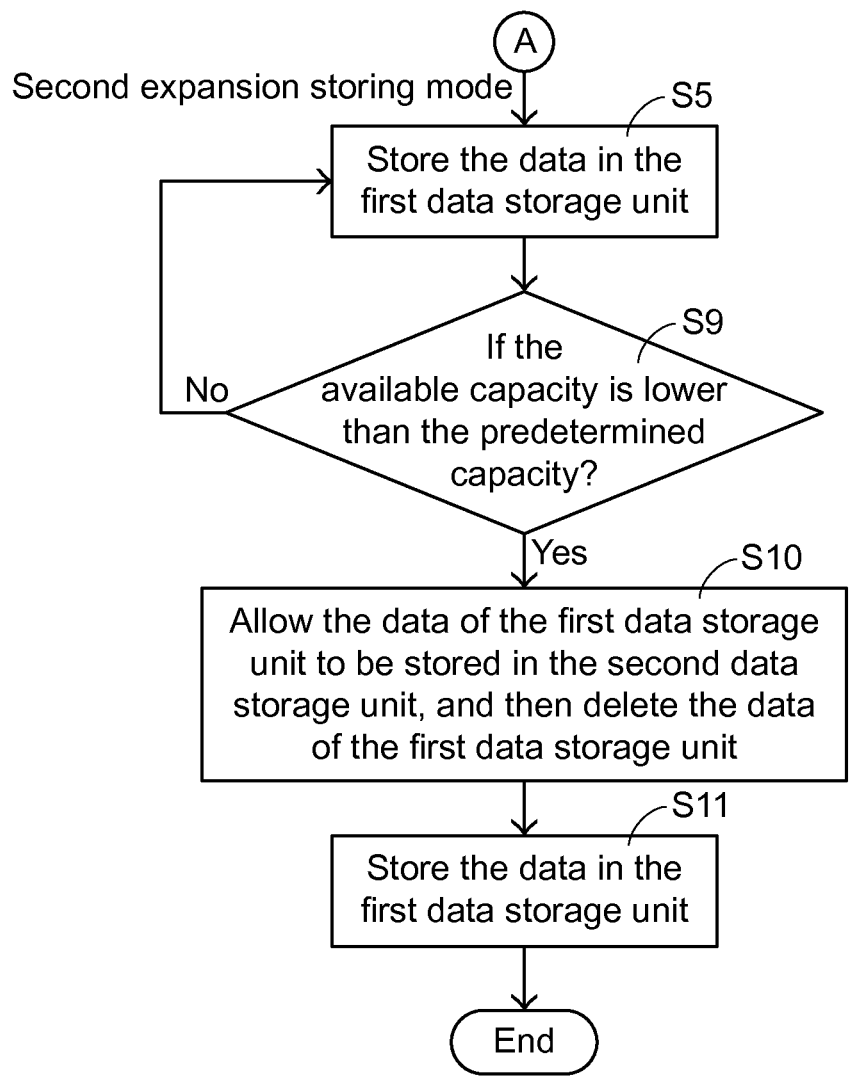

Preferably but not exclusively, the plural storing modes comprise a first expansion storing mode, a second expansion storing mode and a backup storing mode. In another embodiment, the plural storing modes comprise the first expansion storing mode and the second expansion storing mode. In another embodiment, the plural storing modes comprise the first expansion storing mode and the backup storing mode. In another embodiment, the plural storing modes comprise the second expansion storing mode and the backup storing mode. FIGS. 3A and 3B is a flowchart illustrating a method of storing data by the electrical device of the present invention. As shown in FIGS. 3A and 3B, the method of storing data by the electrical device of the present invention comprises the following steps S1~S11.

In the step S1, the controlling unit 115 judges whether the detachable storage module 12 is connected with the main body 11. If the second transmission interface 123 of the detachable storage module 12 is not electrically connected with the first transmission interface 114 of the main body 11, the controlling unit 115 judges that the detachable storage module 12 is not connected with the main body 11, and then the step S2 is performed. In the step S2, the data generated by the image pickup unit 111 is transmitted from the controlling unit 115 to the first data storage unit 112. Consequently, the data is stored in the first data storage unit 112. Whereas, if the second transmission interface 123 of the detachable storage module 12 is electrically connected with the first transmission interface 114 of the main body 11, the controlling unit 115 judges that the detachable storage module 12 is connected with the main body 11, and then the step S3 is performed.

In the step S3, the controlling unit 115 judges which storing mode is selected. If the controlling unit 115 judges that the selected storing mode is the first expansion storing mode, the step S4 is performed. If the controlling unit 115 judges that the selected storing mode is the second expansion storing mode, the step S5 is performed. If the controlling unit 115 judges that the selected storing mode is the first backup storing mode, the step S6 is performed.

In case that the selected storing mode is the first expansion storing mode, the step S4 is performed. In the step S4, the data generated by the image pickup unit 111 is transmitted from the controlling unit 115 to the first data storage unit 112. Consequently, the data is stored in the first data storage unit 112. Then, the step S7 is performed. In the step S7, the controlling unit 115 judges whether the available capacity of the first data storage unit 112 is lower than a predetermined capacity. For example, the predetermined capacity is 15 MB, but is not limited thereto.

If the controlling unit 115 judges that the available capacity of the first data storage unit 112 is not lower than the predetermined capacity in the step S7, it means that the first data storage unit 112 still has sufficient capacity to continuously store the data. Consequently, the step S4 is repeatedly done. In the step S4, the data generated by the image pickup unit 111 is continuously transmitted from the controlling unit 115 to the first data storage unit 112, and the data is stored in the first data storage unit 112. Whereas, if the controlling unit 115 judges that the available capacity of the first data storage unit 112 is lower than the predetermined capacity in the step S7, it means that the first data storage unit 112 does not have sufficient capacity to continuously store the data. Then, the step S8 is performed. In the step S8, the data generated by the image pickup unit 111 is continuously transmitted from the controlling unit 115 to the second data storage unit 121, and the data is stored in the second data storage unit 121.

In case that the selected storing mode is the second expansion storing mode, the step S5 is performed. In the step S5, the data generated by the image pickup unit 111 is transmitted from the controlling unit 115 to the first data storage unit 112. Consequently, the data is stored in the first data storage unit 112. Then, the step S9 is performed. In the step S9, the controlling unit 115 judges whether the available capacity of the first data storage unit 112 is lower than a predetermined capacity. For example, the predetermined capacity is 15 MB, but is not limited thereto.

If the controlling unit 115 judges that the available capacity of the first data storage unit 112 is not lower than the predetermined capacity in the step S9, it means that the first data storage unit 112 still has sufficient capacity to continuously store the data. Consequently, the step S5 is repeatedly done. In the step S5, the data generated by the image pickup unit 111 is continuously transmitted from the controlling unit 115 to the first data storage unit 112, and the data is stored in the first data storage unit 112. Whereas, if the controlling unit 115 judges that the available capacity of the first data storage unit 112 is lower than the predetermined capacity in the step S9, it means that the first data storage unit 112 does not have sufficient capacity to continuously store the data. Then, the step S10 is performed.

In the step S10, the data in the first data storage unit 112 is copied to the second data storage unit 121 by the controlling unit 115, so that the data in the first data storage unit 112 is stored in the second data storage unit 121. Then, the data in the first data storage unit 112 is deleted, so that the available capacity of the first data storage unit 112 is increased. After the step S10, the step S11 is performed. In the step S11, the data generated by the image pickup unit 111 is continuously transmitted from the controlling unit 115 to the second data storage unit 121, and the data is stored in the second data storage unit 121.

In the above embodiment, when the electrical device 10 is operated in the first expansion storing mode or the second expansion storing mode, the data is firstly stored in the first data storage unit 112 under control of the controlling unit 115. It is noted that the data storage unit with the higher priority of storing the data is not restricted. In another embodiment, the data is firstly stored in the second data storage unit 121 under control of the controlling unit 115. For example, in the first expansion storing mode, the data is firstly stored in the second data storage unit 121 by the controlling unit 115 until the available capacity of the second data storage unit 121 is lower than the predetermined capacity, and then the data is stored in the first data storage unit 112. Similarly, in the second expansion storing mode, the data is firstly stored in the second data storage unit 121 by the controlling unit 115 until the available capacity of the second data storage unit 121 is lower than the predetermined capacity, and the data in the second data storage unit 121 is stored in the first data storage unit 112. In addition, the data in the second data storage unit 121 is deleted, so that the available capacity of the second data storage unit 121 is increased.

In case that the selected storing mode is the backup storing mode, the step S6 is performed. In the step S6, the data generated by the image pickup unit 111 is transmitted from the controlling unit 115 to both of the first data storage unit 112 and the second data storage unit 121. Consequently, the data is stored in both of the first data storage unit 112 and the second data storage unit 121. Under this circumstance, the electrical device 10 has the automatic backup function. If the first data storage unit 112 is suffered from damage due to accident or long-term use, the possibility of losing data will be reduced because the identical data of the first data storage unit 112 is retained in the second data storage unit 121.

Please refer to FIG. 2 again. For further allowing the electrical device 10 to comply with different requirements of the user, the second battery unit 122 of the detachable storage module 12 provides the second electric power P2 to the main body 11 and the controlling unit 115 is selectively operated in one of plural power supplying modes. When the detachable storage module 12 is connected with the main body 11, the controlling unit 115 may judge which power supplying mode is selected from the plural power supplying modes by the user. According to the selected power supplying mode, the controlling unit 115 may determine whether the second electric power P2 from the second battery unit 122 is directly used or the second electric power P2 from the second battery unit 122 is transmitted to the first battery unit 113.

Generally, when the detachable storage module 12 is connected with the main body 11, a portion of the operation interface of the main body 11 is hidden by the detachable storage module 12. Under this circumstance, it is difficult to operate the operation interface of the main body 11. For solving this drawback, as shown in FIG. 1, the detachable storage module 12 further comprises a second operation interface 125 for allowing the user to operate. Moreover, via the second operation interface 125, the user may select a specified power supplying mode from the controlling unit 115. An example of the second operation interface 125 includes but is not limited to a button, a toggle switch or a touch panel. In this embodiment, the second operation interface 125 is a button. In some other embodiments, the first operation interface 124 and the second operation interface 125 may be integrated into a single operation interface (e.g. a touch panel). Moreover, the detachable storage module 12 further comprises a third operation interface 126 for allowing the user to turn on/off the power source of the main body 11.

Figure 4:
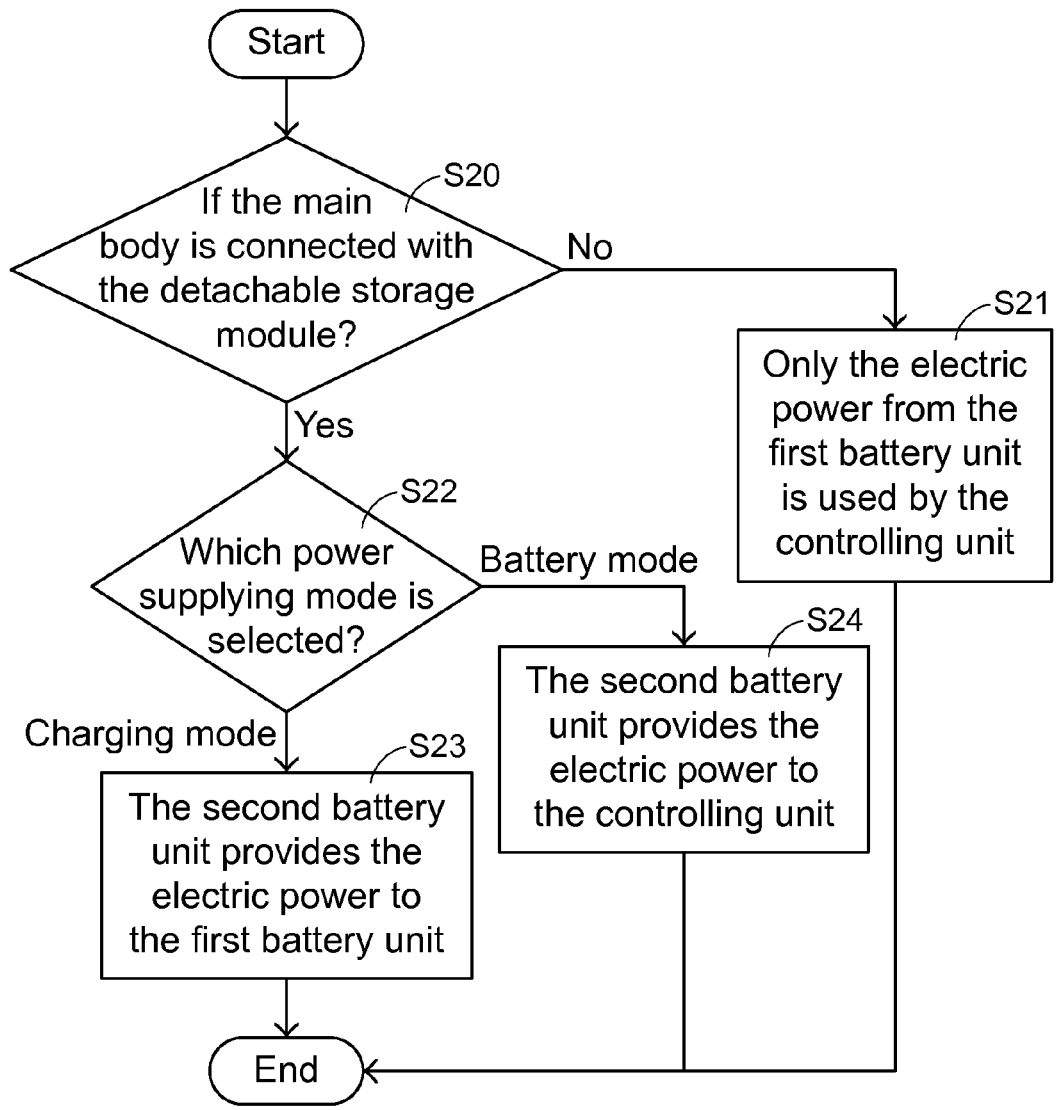
FIG. 4 is a flowchart illustrating a method of providing electric power by the electrical device of the present invention.

In this embodiment, the plural power supplying modes comprise a charging mode and a battery mode. FIG. 4 is a flowchart illustrating a method of providing electric power by the electrical device of the present invention. As shown in FIG. 4, the method of providing electric power by the electrical device of the present invention comprises the following steps S20~S24.

In the step S20, the controlling unit 115 judges whether the detachable storage module 12 is connected with the main body 11. If the second transmission interface 123 of the detachable storage module 12 is not electrically connected with the first transmission interface 114 of the main body 11, the controlling unit 115 judges that the detachable storage module 12 is not connected with the main body 11, and then the step S21 is performed. In the step S21, the first electric power P1 from the first battery unit 113 is directly used by the controlling unit 115. Whereas, if the second transmission interface 123 of the detachable storage module 12 is electrically connected with the first transmission interface 114 of the main body 11, the controlling unit 115 judges that the detachable storage module 12 is connected with the main body 11, and then the step S22 is performed.

In the step S22, the controlling unit 115 judges which power supplying mode is selected. If the controlling unit 115 judges that the selected power supplying mode is the charging mode, the step S23 is performed. If the controlling unit 115 judges that the selected power supplying mode is the battery mode, the step S24 is performed.

In the step S23, the first battery unit 113 continuously provides the first electric power P1 to the controlling unit 115, and the second battery unit 122 provides the second electric power P2 to the first battery unit 113 so as to charge the first battery unit 113. Under this circumstance, the first electric power P1 from the first battery unit 113 is directly used by the controlling unit 115, and the second electric power P2 from the second battery unit 122 is indirectly used by the controlling unit 115. For example, if the controlling unit 115 needs n units of electric power per unit time, the first battery unit 113 provides n units of the first electric power P1 to the controlling unit 115 per unit time, and the second battery unit 122 provides n units of the second electric power P2 to the first battery unit 113 per unit time so as to charge the first battery unit 113.

In the step S24, the first battery unit 113 continuously provides the first electric power P1 to the controlling unit 115, and the second battery unit 122 also provides the second electric power P2 to the controlling unit 115. Under this circumstance, the first electric power P1 from the first battery unit 113 is directly used by the controlling unit 115 and the second electric power P2 from the second battery unit 122 are directly used by the controlling unit 115. For example, if the controlling unit 115 needs n units of electric power per unit time, the first battery unit 113 provides n/2 units of the first electric power P1 to the controlling unit 115 per unit time, and the second battery unit 122 provides n/2 units of the second electric power P2 to the controlling unit 115. Consequently, the required electric quantity is provided to the controlling unit 115.

It is noted that the step S24 may be modified or altered. In another embodiment, in the step S24, the second battery unit 122 also provides the second electric power P2 to the controlling unit 115, but the first battery unit 113 no longer provides the first electric power P1 to the controlling unit 115. Until the residual electric quantity of the second battery unit 122 is lower than a predetermined electric quantity, the first battery unit 113 will provide the first electric power P1 to the controlling unit 115 again. Preferably but not exclusively, the predetermined electric quantity is 5% of the full electric quantity of the second battery unit 122.

Figure 5:
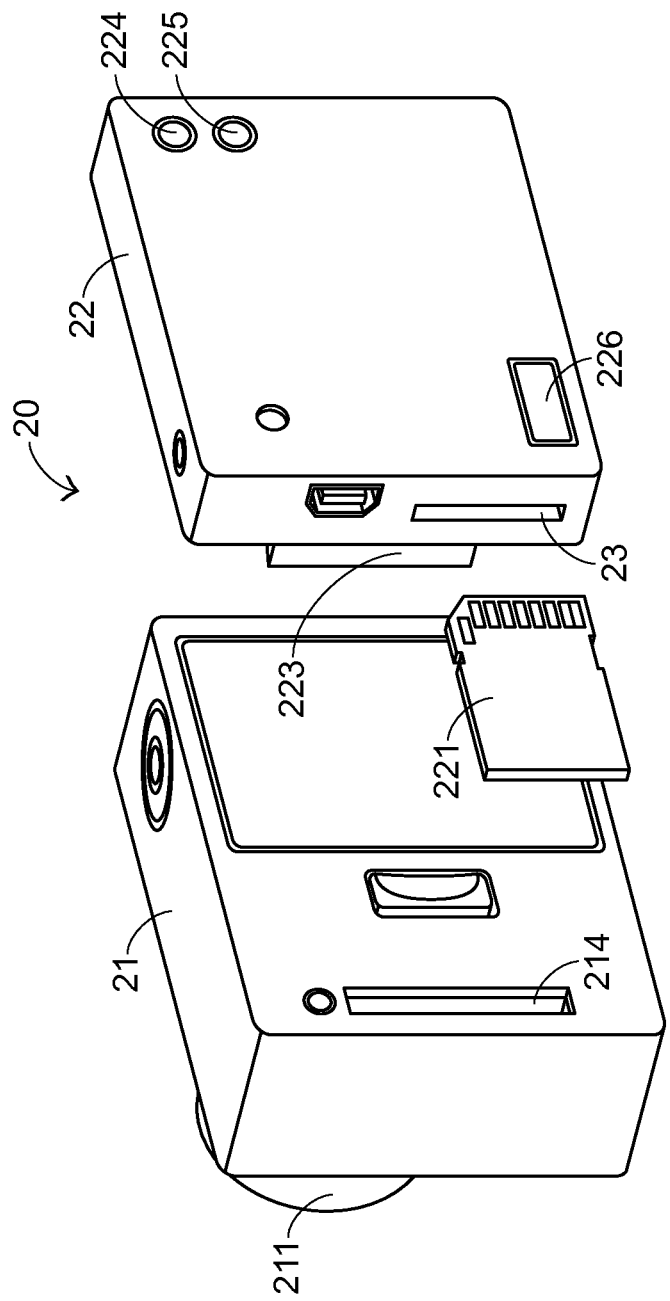
FIG. 5 schematically illustrates an electrical device with a detachable storage module according to a second embodiment of the present invention.
Figure 6:
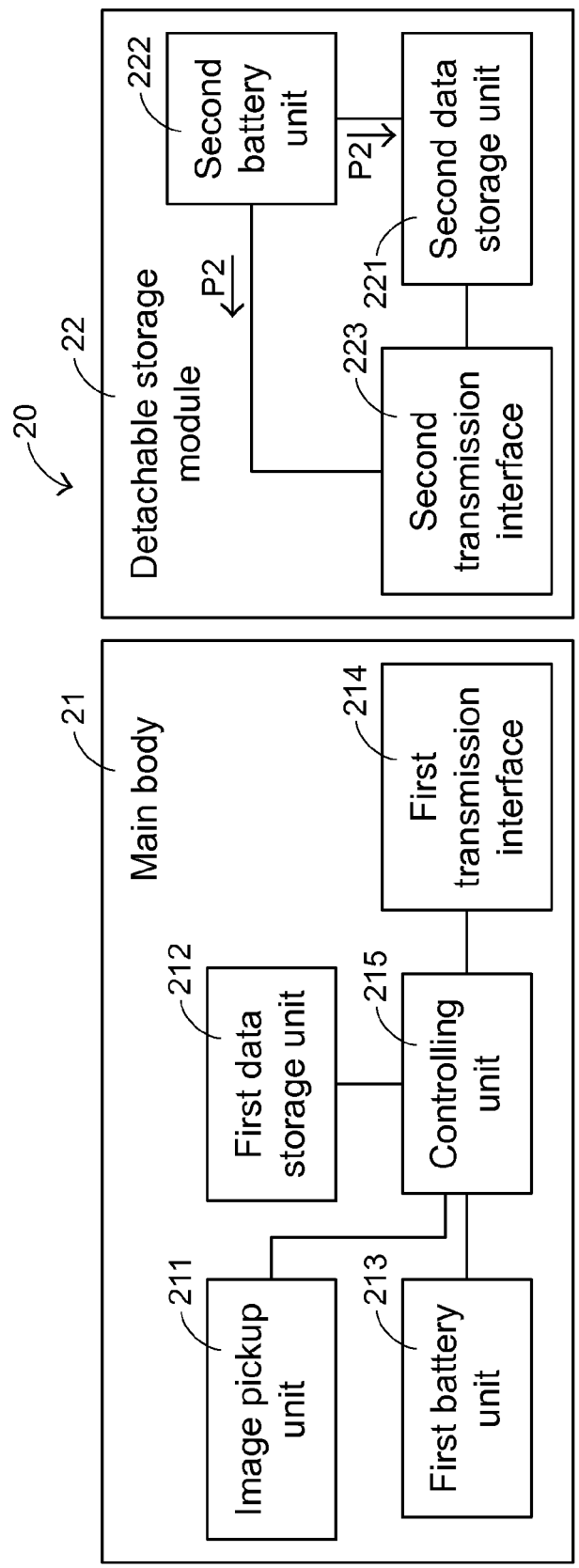
FIG. 6 is a schematic functional block diagram illustrating the electrical device with the detachable storage module according to the second embodiment of the present invention.

Hereinafter, a second embodiment of the present invention will be illustrated with reference to FIG. 5. FIG. 5 schematically illustrates an electrical device with a detachable storage module according to a second embodiment of the present invention. As shown in FIG. 5, the electrical device 20 comprises a main body 21 and a detachable storage module 22. The main body 21 may generate a data. The detachable storage module 22 is used for providing electric power and a data storage space to the main body 21. FIG. 6 is a schematic functional block diagram illustrating the electrical device with the detachable storage module according to the second embodiment of the present invention. As shown in FIG. 6, the main body 21 comprises an image pickup unit 211, a first data storage unit 212, a first battery unit 213, a first transmission interface 214 and a controlling unit 215, and the detachable storage module 22 comprises a second data storage unit 221, a second battery unit 222, a second transmission interface 223, a first operation interface 224, a second operation interface 225 and a third operation interface 226.

Except that the second data storage unit 221 of the detachable storage module 22 is an external memory card and the detachable storage module 22 further comprises a card slot 23 (see FIG. 5), the other components, the data storing method and the power supplying method of the electrical device 20 of this embodiment are identical to those of the electrical device 10 as shown in FIGS. 1 and 2, and are not redundantly described herein. The second data storage unit 221 is accommodated within the card slot 23. An example of the second data storage unit 221 includes but is not limited to a secure digital memory card (SD card) or a micro SD card.

As shown in FIG. 6, the second battery unit 222 of the detachable storage module 22 provides a second electric power P2 to the main body 21. Moreover, the second battery unit 222 of the detachable storage module 22 is further electrically connected with the second data storage unit 221 of the detachable storage module 22 and provides the second electric power P2 to the second data storage unit 221. In this embodiment, the second battery unit 222 is the only power source of the second data storage unit 221. Moreover, the full electric quantity of the second battery unit 222 is higher than the consumed electric quantity for storing the data from the image pickup unit 211 to the full capacity of the second data storage unit 221. That is, even if the available capacity of the second data storage unit 221 is insufficient to store the data, the second battery unit 222 can provide sufficient electric power to the main body 21.

Figure 7:
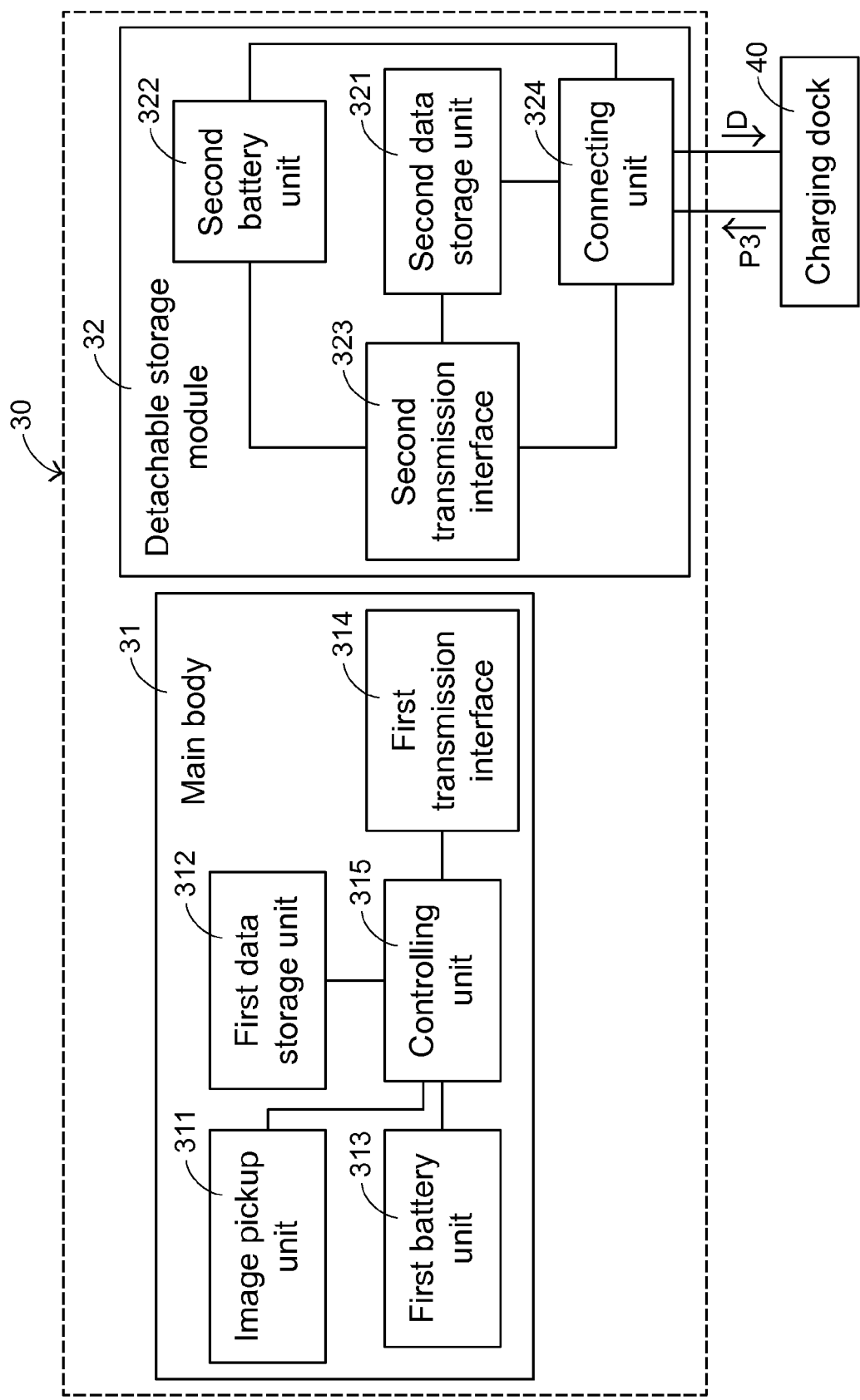
FIG. 7 is a schematic functional block diagram illustrating an electrical device with a detachable storage module according to a third embodiment of the present invention.

Hereinafter, a third embodiment of the present invention will be illustrated with reference to FIG. 7. FIG. 7 is a schematic functional block diagram illustrating an electrical device with a detachable storage module according to a third embodiment of the present invention. As shown in FIG. 7, the electrical device 30 comprises a main body 31 and a detachable storage module 32. The main body 31 comprises an image pickup unit 311, a first data storage unit 312, a first battery unit 313, a first transmission interface 314 and a controlling unit 315, and the detachable storage module 32 comprises a second data storage unit 321, a second battery unit 322, a second transmission interface 323, and a connecting unit 324.

Except that the detachable storage module 32 further comprises the connecting unit 324 and the detachable storage module 32 is in wired or wireless communication with a charging dock 40 through connecting unit 324, the other components, the data storing method and the power supplying method of the electrical device 30 of this embodiment are identical to those of the electrical device 10 as shown in FIGS. 1 and 2, and are not redundantly described herein. In this embodiment, the detachable storage module 32 can be charged by the charging dock 40.

Please refer to FIG. 7 again. The second data storage unit 321 and the second battery unit 322 of the detachable storage module 32 are electrically connected with the second transmission interface 323, and the second data storage unit 321 and the second battery unit 322 are also electrically connected with the connecting unit 324. The connecting unit 324 is in communication with the charging dock 40. An example of the connecting module 324 includes but is not limited to a USB interface.

When the detachable storage module 32 is in wired or wireless communication with the charging dock 40, the detachable storage module 32 receives a third electric power P3 from the charging dock 40. Moreover, the third electric power P3 is transmitted to the second battery unit 322 so as to charge the second battery unit 322. For facilitating the user to output the data of the second data storage unit 321, the following procedure may be performed. For example, when the detachable storage module 32 is in wired or wireless communication with the charging dock 40, the data D in the second data storage unit 321 may be automatically or manually transmitted from the detachable storage module 32 to the charging dock 40. Then, the data D is temporarily stored in a data storage unit (not shown) of the charging dock 40, or directly transmitted to another device (not shown) or a cloud server (not shown) by a wired transmission technology or a wireless transmission technology. In other words, when the detachable storage module 32 is in communication with the charging dock 40, the charging dock 40 not only charges the detachable storage module 32 but also receives the data from the detachable storage module 32.

From the above descriptions, the present invention provides the electrical device. The electrical device comprises the main body and the detachable storage module. The main body is operable in plural storing modes. The detachable storage module comprises the second data storage unit and the second battery unit. The user may select one of the plural storing modes. According to the selected storing mode, the controlling unit of the main body determines whether the data is stored in the first data storage unit or the second data storage unit. By the detachable storage module, the overall electric quantity and the overall data storage space of the electrical device are increased, and the run time of the electrical device is increased. Moreover, after the detachable storage module is connected with the main body, the user may select a desired storing mode or even select a desired storing mode and a desired power supplying mode. Consequently, the electrical device is more user-friendly.

While the invention has been described in terms of what is presently considered to be the most practical and preferred embodiments, it is to be understood that the invention needs not be limited to the disclosed embodiments. On the contrary, it is intended to cover various modifications and similar arrangements included within the spirit and scope of the appended claims which are to be accorded with the broadest interpretation so as to encompass all such modifications and similar structures.

What is claimed is:
1. An electrical device with a detachable storage module, the electrical device comprising:
   a main body generating a data, and comprising:
      a first data storage unit storing the data;
      a first battery unit providing a first electric power; and
      a controlling module electrically connected with the first data storage unit, the first battery unit and the detachable storage module; and the detachable storage module comprising:
a second data storage unit storing the data from the main body; and
a second battery unit providing a second electric power to the main body,
wherein the controlling unit is operable in plural storing modes, wherein according to a selected storing mode of the plural storing modes, the controlling unit determines whether the data is stored in the first data storage unit or the second data storage unit,
wherein when the detachable storage module is in communication with a charging dock, a third electric power is tranmitted from the charging dock to the detachable storage module so as to charge the second battery unit, wherein the data in the second data storage unit is further transmitted from the detachable storage module to the charging dock.

2. The electrical device according to claim 1, wherein the plural storing modes comprise a first expansion storing mode, a second expansion storing mode and a backup storing mode, wherein if the selected storing mode is the first expansion storing mode, the data is firstly stored in the first data storage unit until an available capacity of the first data storage unit is lower than a predetermined capacity and then the data is stored in the second data storage unit, wherein if the selected storing mode is the second expansion storing mode, the data is firstly stored in the first data storage unit until the available capacity of the first data storage unit is lower than the predetermined capacity, and then the data in the first data storage unit is stored in the second data storage unit and the data in the first data storage unit is deleted, wherein if the selected storing mode is the backup storing mode, the data is stored in both of the first data storage unit and the second data storage unit.

3. The electrical device according to claim 1, wherein the controlling unit is further operable in plural power supply modes, and the plural power supply modes comprise a charging mode and a battery mode, wherein if the controlling unit is in the charging mode, the second battery unit provides the second electric power to the first battery unit so as to charge the first battery unit, wherein if the controlling unit is in the battery mode, the second battery unit provides the second electric power to the controlling unit.

4. The electrical device according to claim 1, wherein the main body is an image pickup device, and the data generated by the main body is an image data or a video data.

5. The electrical device according to claim 1, wherein the main body further comprises a first transmission interface, and the detachable storage module further comprises a second transmission interface, wherein the first transmission interface is electrically connected with the controlling unit, and the second transmission interface is connectable with the first transmission interface.

6. The electrical device according to claim 1, wherein the first transmission interface and the second transmission interface are universal serial bus (USB) interfaces.

7. The electrical device according to claim 1, wherein each of the first data storage unit and the second data storage unit is a hard disk, a memory card or an external memory card.

8. The electrical device according to claim 1, wherein the detachable storage module further comprises a card slot, and the second data storage unit is an external memory card, wherein the second data storage unit is accommodated within the card slot.

9. The electrical device according to claim 1, wherein the detachable storage module further comprises a connecting unit, and the connecting unit is in wired or wireless communication with a charging dock, wherein the second battery unit of the detachable storage module is charged by the charging dock.

10. The electrical device according to claim 1, wherein the second data storage unit is electrically connected with the second battery unit, and the second battery unit provides the second electric power to the second data storage unit.

* * * * *